US012311673B2

(12) United States Patent
Nishikawa

(10) Patent No.: US 12,311,673 B2
(45) Date of Patent: May 27, 2025

(54) LIQUID SUPPLY APPARATUS

(71) Applicant: RISO KAGAKU CORPORATION, Tokyo (JP)

(72) Inventor: Ryosuke Nishikawa, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 187 days.

(21) Appl. No.: 18/218,770

(22) Filed: Jul. 6, 2023

(65) Prior Publication Data

US 2024/0092086 A1 Mar. 21, 2024

(30) Foreign Application Priority Data

Sep. 21, 2022 (JP) ................................ 2022-150350

(51) Int. Cl.
*B41J 2/175* (2006.01)
*B41J 2/045* (2006.01)

(52) U.S. Cl.
CPC ....... *B41J 2/17596* (2013.01); *B41J 2/04501* (2013.01); *B41J 2/17523* (2013.01)

(58) Field of Classification Search
CPC ................ B41J 2/17596; B41J 2/04501; B41J 2/17523; B41J 2/175; B41J 2/17509
See application file for complete search history.

(56) References Cited

U.S. PATENT DOCUMENTS 9,327,514 B2 * 5/2016 Nishiyama .............. B41J 2/175

FOREIGN PATENT DOCUMENTS

JP 2018-1687 A 1/2018

* cited by examiner

*Primary Examiner* — Bradley W Thies
(74) *Attorney, Agent, or Firm* — Greenblum & Bernstein, P.L.C.

(57) ABSTRACT

A liquid supply apparatus includes: a liquid container; branch paths branching from a path connected to the liquid container, the branch paths being connected to tanks arranged at height positions different from one another and lower than the liquid container; supply valves arranged in the branch paths respectively; and a controller configured to control the supply valves to supply a liquid from the liquid container to each of the tanks. The controller is configured to control the supply valves to temporally separately perform supply of the liquid to tanks of the tanks having a height difference equal to or more than a prescribed value therebetween.

3 Claims, 12 Drawing Sheets

LIQUID SUPPLY APPARATUS

CROSS-REFERENCE TO RELATED APPLICATIONS

The present application is based on and claims the benefit of priority from the prior Japanese Patent Application No. 2022-150350, filed on Sep. 21, 2022, the entire contents of which are incorporated by reference herein.

TECHNICAL FIELD

The disclosure is directed to a liquid supply apparatus.

BACKGROUND

Ink circulation-type inkjet printers in which an ink is ejected from an inkjet head to print while the ink is circulated by applying a positive pressure and a negative pressure respectively to a positive-pressure tank and a negative-pressure tank which are connected to the inkjet head have been known.

Japanese Unexamined Patent Application Publication No. 2018-1687 proposes an inkjet printer which includes an inkjet head arranged to be capable of ejecting an ink in a horizontal direction and which is capable of printing on a surface perpendicular to the horizontal direction, such as a side of a cardboard box.

As an inkjet printer of this type, there is one which includes multiple inkjet heads arranged along a vertical direction and which prints by ejecting an ink from the inkjet heads onto a surface, perpendicular to the horizontal direction, of a print medium.

In addition, as an ink circulation-type inkjet printer as described above which includes multiple inkjet heads arranged along a vertical direction, there is one which includes multiple ink towers each having a positive-pressure tank and a negative-pressure tank.

In this inkjet printer, the multiple ink towers are each connected to a prescribed number of inkjet heads. The multiple ink towers are arranged at height positions different from one another in accordance with height positions of the inkjet heads connected to each ink tower. This suppresses difference in nozzle pressure among the inkjet heads attributable to difference in hydraulic head pressure between each inkjet head and the positive-pressure tank and negative-pressure tank to a low level, and thus contains the nozzle pressure of each inkjet head within such a range that enables stable ejection.

In such an inkjet printer, there is one which includes an ink supplier configured to supply an ink to multiple ink towers by using a hydraulic head pressure from a single ink cartridge common to the multiple ink towers. This ink supplier has multiple branch paths which branch from a path connected to the ink cartridge, and each branch path is connected to the negative-pressure tank of the corresponding ink tower. A valve is arranged in each branch path, and the ink flows into the negative-pressure tank as the valve is opened.

SUMMARY OF THE INVENTION

In the above-described inkjet printer, in the case where the ink is to be supplied simultaneously to the multiple negative-pressure tanks by simultaneously opening the valves of the multiple branch paths, failures in supplying the ink may occur.

For example, since the hydraulic head pressures between the negative-pressure tanks of the respective ink towers and the ink cartridge are different, deviation may occur in the supply amounts of the ink to the respective negative-pressure tanks. This may generate a negative-pressure tank for which the supply of the ink is delayed as compared with the other negative-pressure tanks, which may cause trouble in the operation of the printer.

In addition, the ink may move from a negative-pressure tank which is located at a high position and has a relatively small hydraulic head pressure with the ink cartridge to a negative-pressure tank which is located at a low position and has a relatively large hydraulic head pressure with the ink cartridge. This may generate a negative-pressure tank with the ink reduced, which may cause trouble in the operation of the printer.

The disclosure is directed to a liquid supply apparatus capable of reducing failures in supplying a liquid such as an ink.

A liquid supply apparatus in accordance with some embodiments includes: a liquid container; branch paths branching from a path connected to the liquid container, the branch paths being connected to tanks arranged at height positions different from one another and lower than the liquid container; supply valves arranged in the branch paths respectively; and a controller configured to control the supply valves to supply a liquid from the liquid container to each of the tanks. The controller is configured to control the supply valves to temporally separately perform supply of the liquid to tanks of the tanks having a height difference equal to or more than a prescribed value therebetween.

The above-described configurations make it possible to reduce failures in supplying a liquid.

DETAILED DESCRIPTION OF THE INVENTION

Figure 1:
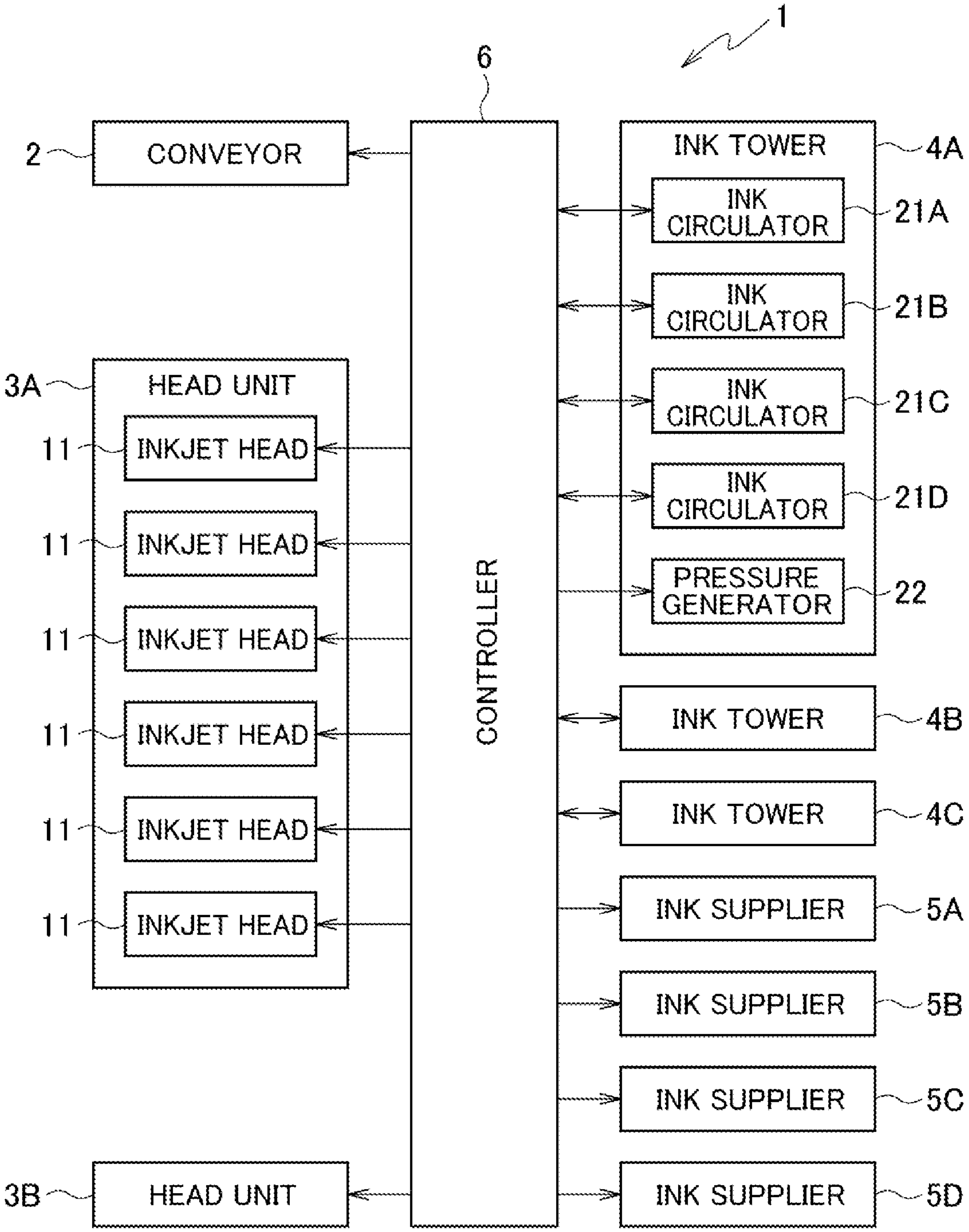
FIG. 1 is a block diagram illustrating a configuration of an inkjet printer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
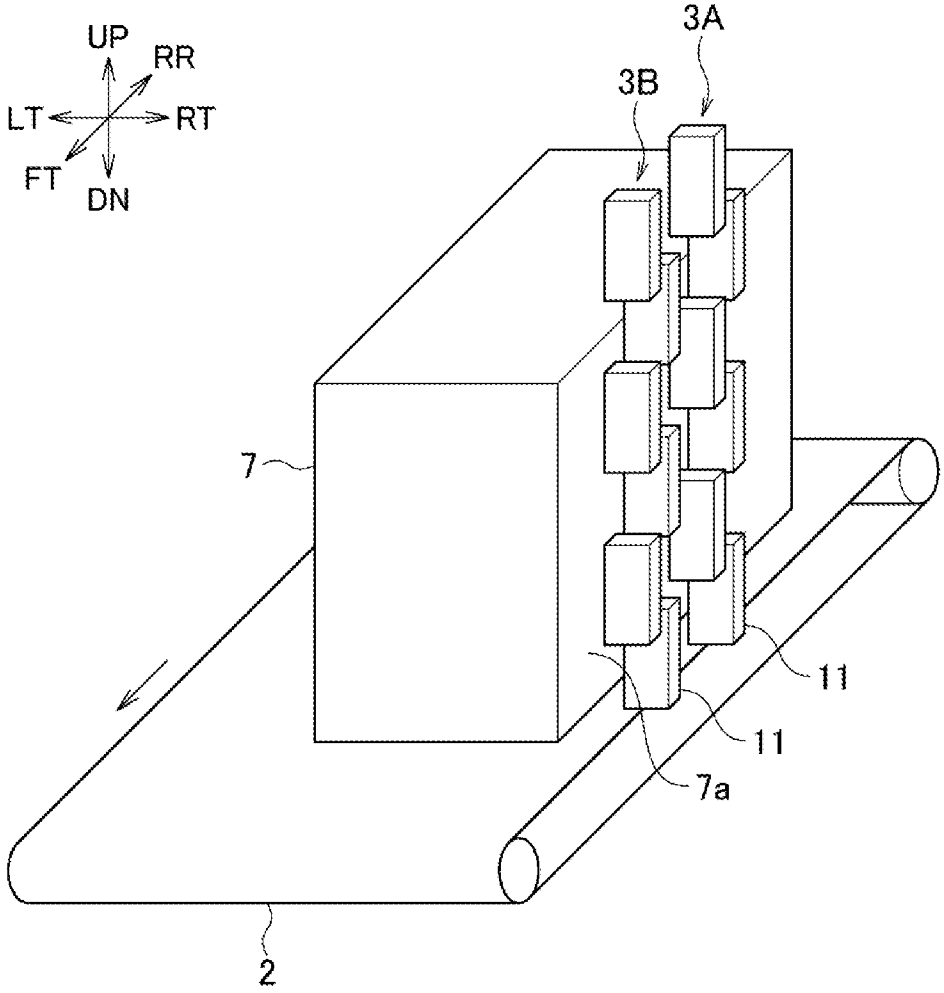
FIG. 2 is a schematic configuration diagram of a conveyor and head units of the inkjet printer of FIG. 1.
Figure 3:
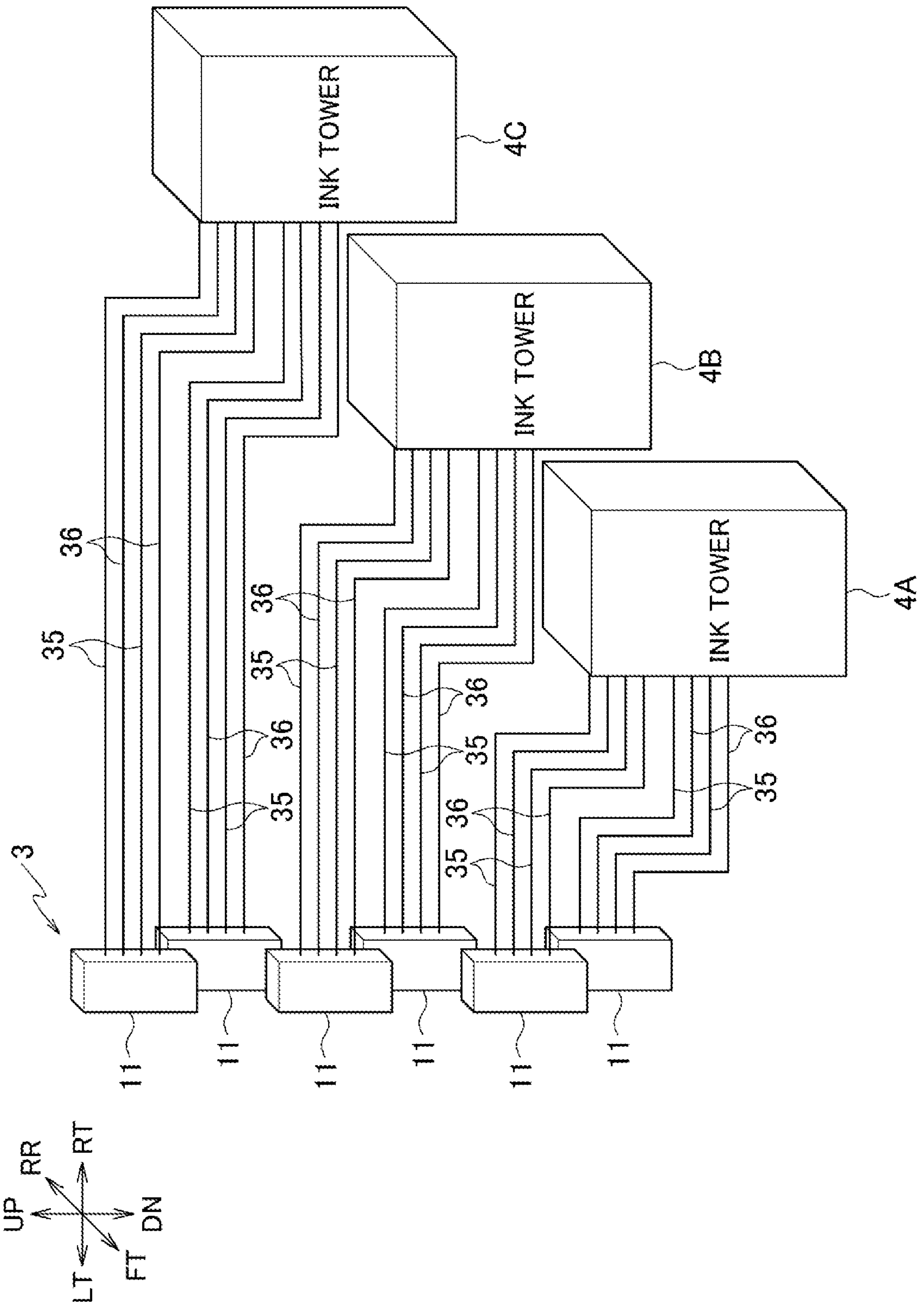
FIG. 3 is a schematic configuration diagram of the head units and ink towers of the inkjet printer of FIG. 1.
Figure 4:
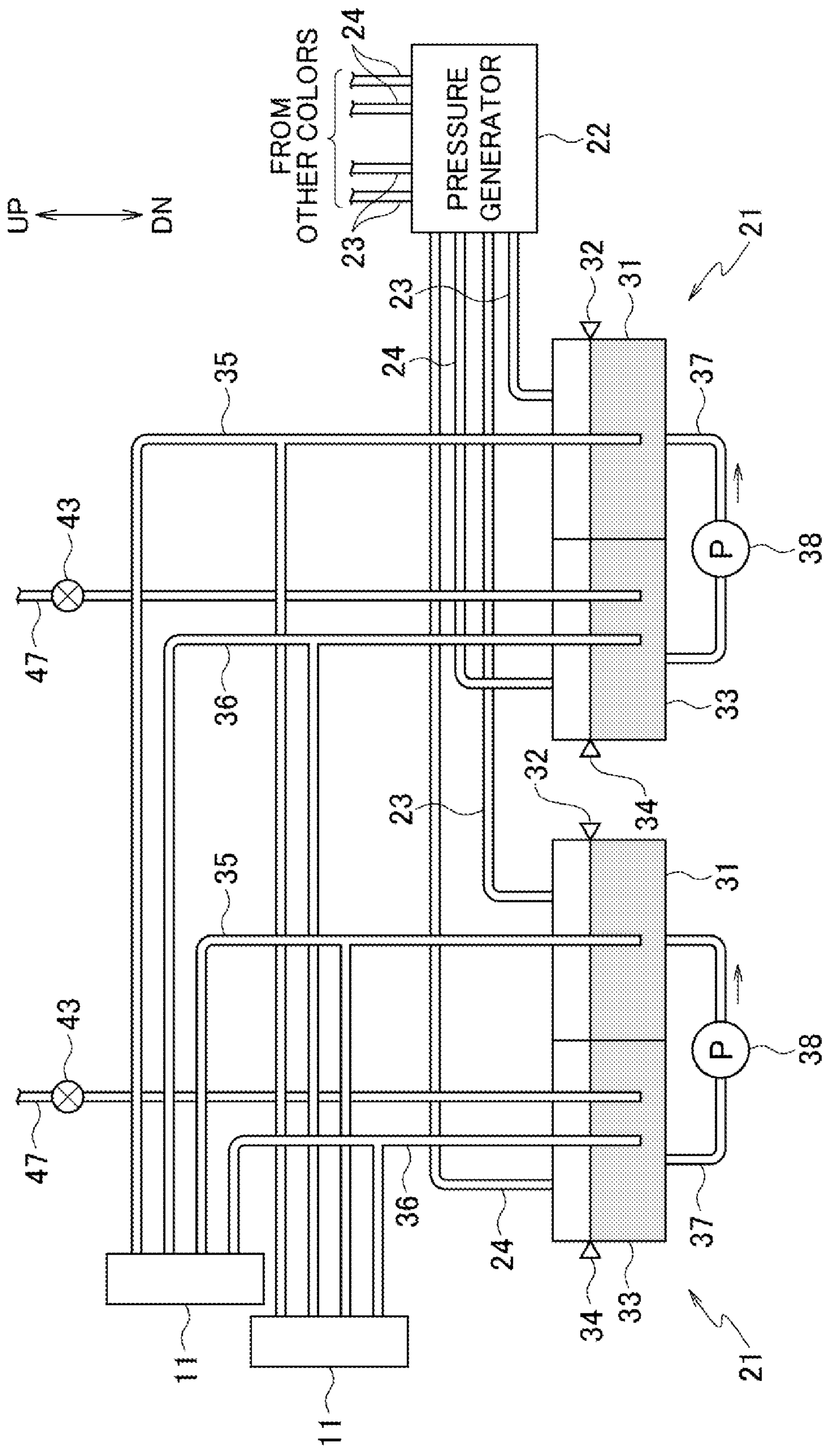
FIG. 4 is a schematic configuration diagram of the ink towers of the inkjet printer of FIG. 1.
Figure 5:
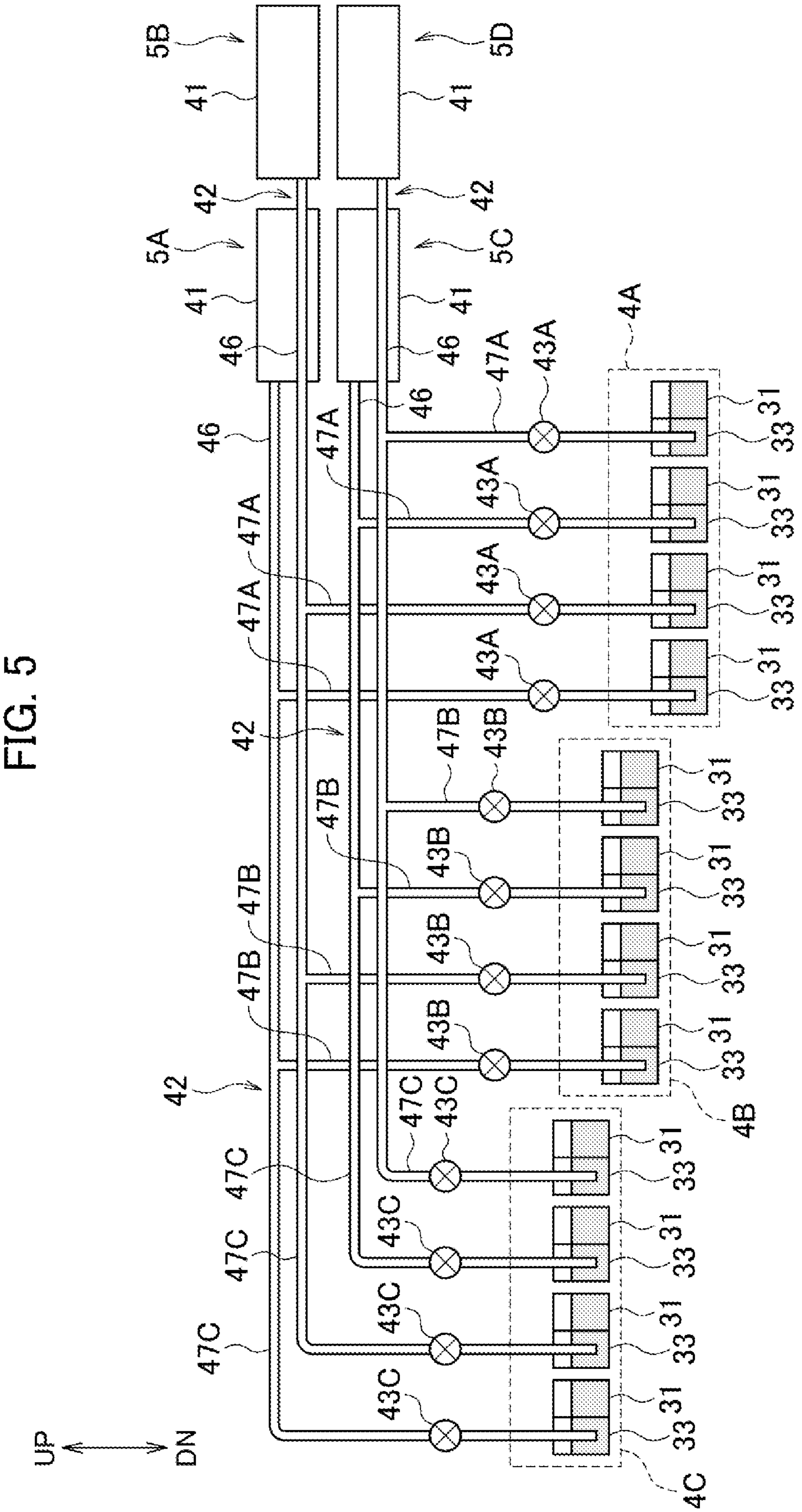
FIG. 5 is a schematic configuration diagram of ink suppliers of the inkjet printer of FIG. 1.

FIG. 1 is a block diagram illustrating a configuration of an inkjet printer 1 equipped with a liquid supply apparatus according to an embodiment of the present invention. FIG. 2 is a schematic configuration diagram of a conveyor 2 and head units 3A and 3B of the inkjet printer 1 illustrated in FIG. 1. FIG. 3 is a schematic configuration diagram of the head units 3A and 3B and ink towers 4A to 4C of the inkjet printer 1 illustrated in FIG. 1. FIG. 4 is a schematic configuration diagram of the ink towers 4A to 4C of the inkjet printer 1 illustrated in FIG. 1. FIG. 5 is a schematic configuration diagram of ink suppliers 5A to 5D of the inkjet printer 1 illustrated in FIG. 1. In the following description, up, down, left, right, front, and rear indicated by arrows in FIG. 2 are referred to as upward, downward, left, right, front, and rear directions. The upward-downward direction is a vertical direction, and the left-right direction and the front-rear direction are directions perpendicular to each other, and both perpendicular to the upward-downward direction, and parallel to a horizontal direction. In FIGS. 2 to 5, the right direction, the left direction, the upward direction, the downward direction, the front direction, and the rear direction are indicated by RT, LT, UP, DN, FT, and RR, respectively.

As illustrated in FIG. 1, the inkjet printer 1 includes a conveyor 2, the head units 3A and 3B, the ink towers 4A to 4C, the ink suppliers 5A to 5D, and a controller 6. Note that the liquid supply apparatus includes the ink suppliers 5 and the controller 6. In the following description, in some cases, the head units 3A and 3B, and the like are collectively described by omitting the attached alphabets in the reference signs.

The conveyor 2 is configured to convey a print medium 7. The print medium 7 has a print surface 7*a* on which printing is performed by the head units 3. The print surface 7*a* is a surface (a vertical surface) perpendicular to the horizontal direction in the state where the print medium 7 is placed on and conveyed by the conveyor 2. The print medium 7 is, for example, a cardboard box.

The head units 3A and 3B are each configured to perform printing by ejecting inks toward the print surface 7*a* of the print medium 7 in the horizontal direction. The head units 3A and 3B are each configured to eject inks of two colors. For example, the head unit 3A is configured to eject inks of black and cyan, and the head unit 3B is configured to eject inks of magenta and yellow. The head units 3A and 3B have the same configuration except that the colors of inks to be ejected are different.

As illustrated in FIG. 1 to FIG. 3, the head unit 3 includes multiple inkjet heads 11. In the present embodiment, the head unit 3 includes six inkjet heads 11.

In the head unit 3, the six inkjet heads 11 are arranged in a zigzag manner along the upward-downward direction. That is, in the head unit 3, the six inkjet heads 11 arranged in a row along the upward-downward direction are arranged while being displaced alternately in the front-rear direction.

The inkjet head 11 is configured to eject the inks of two colors. The inkjet head 11 has two nozzle arrays in each of which multiple nozzles (not illustrated) configured to eject the ink are linearly arranged in a row at a prescribed pitch in the upward-downward direction. The two nozzle arrays are configured to eject the inks of colors different from each other.

The ink towers 4A to 4C are configured to supply the inks to the head units 3A and 3B. The ink tower 4A is configured to supply the inks to the first and second inkjet heads 11 from below in each of the head units 3A and 3B. The ink tower 4B is configured to supply the inks to the third and fourth inkjet heads 11 from below in each of the head units 3A and 3B. The ink tower 4C is configured to supply the inks to the fifth and sixth inkjet heads 11 from below in each of the head units 3A and 3B.

Note that in FIG. 3, only one head unit 3 out of the head units 3A and 3B is illustrated, and the illustration of the other head unit 3 is omitted.

The ink towers 4A to 4C are arranged such that their height differences from the inkjet heads 11 to which the ink towers 4A to 4C supply the inks are equal among all the ink towers 4A to 4C. Hence, the ink towers 4A to 4C are arranged at height positions different from one another. Among the ink towers 4A to 4C, the ink tower 4A is arranged at the lowest position, and the ink tower 4C is arranged at the highest position.

The ink tower 4 includes ink circulators 21A to 21D, a pressure generator 22, four positive-pressure air paths 23 (see FIG. 4), and four negative-pressure air paths 24 (see FIG. 4).

The ink circulators 21A to 21D are each configured to supply the ink to the inkjet head 11 while circulating the ink. The ink circulators 21A to 21D are each configured to supply the ink of a different color to the inkjet head 11 which ejects the ink of the color held by the ink circulator 21.

The ink circulators 21A and 21B are connected to two inkjet heads 11 arranged at height positions different from each other in the head unit 3A, and supply the inks to these two inkjet heads 11. The ink circulators 21C and 21D are connected to two inkjet heads 11 arranged at height positions different from each other in the head unit 3B, and supply the inks to these two inkjet heads 11.

Specifically, the ink circulators 21A and 21B of the ink tower 4A supply the inks to the first and second inkjet heads 11 from below in the head unit 3A. The ink circulators 21C and 21D of the ink tower 4A supply the inks to the first and second inkjet heads 11 from below in the head unit 3B.

In addition, the ink circulators 21A and 21B of the ink tower 4B supply the inks to the third and fourth inkjet heads 11 from below in the head unit 3A. The ink circulators 21C and 21D of the ink tower 4B supply the inks to the third and fourth inkjet heads 11 from below in the head unit 3B.

In addition, the ink circulators 21A and 21B of the ink tower 4C supply the inks to the fifth and sixth inkjet heads 11 from below in the head unit 3A. The ink circulators 21C and 21D of the ink tower 4C supply the inks to the fifth and sixth inkjet heads 11 from below in the head unit 3B.

As illustrated in FIG. 4, the ink circulator 21 includes a positive-pressure tank 31, a positive-pressure tank liquid level sensor 32, a negative-pressure tank (a tank) 33, a negative-pressure tank liquid level sensor 34, a positive-pressure-side ink path 35, a negative-pressure-side ink path 36, a pump liquid sending path 37, and an ink pump 38. Note that FIG. 4 illustrates two ink circulators 21 (for two colors) which supply the inks to the same head unit 3, among the ink circulators 21A to 21D of the ink tower 4.

The positive-pressure tank 31 is configured to retain the ink to be supplied to the inkjet head 11. To the positive-pressure tank 31, a positive pressure for sending the ink to the inkjet head 11 is applied by the pressure generator 22. The positive-pressure tank 31 is arranged at a position lower than the inkjet head 11 arranged at a lower position out of the two inkjet heads 11 connected to the ink circulator 21 including that positive-pressure tank 31. The respective positive-pressure tanks 31 of the ink circulators 21A to 21D of one ink tower 4 are all arranged at the same height position.

The positive-pressure tank liquid level sensor 32 is for detecting whether or not the liquid level of the ink in the positive-pressure tank 31 has reached a reference height. The positive-pressure tank liquid level sensor 32 outputs a signal indicating "on" in the case where the liquid level in the positive-pressure tank 31 is equal to or more than the reference height, and outputs a signal indicating "off" in the case where the liquid level is less than the reference height.

The negative-pressure tank 33 is configured to receive and store the ink that has not been consumed in the inkjet head 11. In addition, the negative-pressure tank 33 is configured to store the ink that is supplied from the ink supplier 5. To the negative-pressure tank 33, a negative pressure for recovering the ink from the inkjet head 11 is applied by the pressure generator 22. The negative-pressure tank 33 is formed by using a tank having the same shape as the positive-pressure tank 31, and is arranged at the same height position as the positive-pressure tank 31.

The negative-pressure tank liquid level sensor 34 is for detecting whether or not the liquid level of the ink in the negative-pressure tank 33 has reached a reference height. The reference height in the negative-pressure tank 33 is the same as the reference height in the positive-pressure tank 31. The negative-pressure tank liquid level sensor 34 outputs a signal indicating "on" in the case where the liquid level in the negative-pressure tank 33 is equal to or more than the reference height, and outputs a signal indicating "off" in the case where the liquid level is less than the reference height.

The positive-pressure-side ink path 35 connects the positive-pressure tank 31 and two inkjet heads 11. Through the positive-pressure-side ink path 35, the ink supplied from the positive-pressure tank 31 to the two inkjet heads 11 flows.

The negative-pressure-side ink path 36 connects two inkjet heads 11 and the negative-pressure tank 33. Through the negative-pressure-side ink path 36, the ink that has not been consumed in the two inkjet heads 11 and is recovered to the negative-pressure tank 33 flows.

The pump liquid sending path 37 is a path through which the ink sent from the negative-pressure tank 33 to the positive-pressure tank 31 by the ink pump 38 flows. The upstream end of the pump liquid sending path 37 in the ink circulation direction is connected to the negative-pressure tank 33, and the downstream end thereof is connected to the positive-pressure tank 31.

The ink pump 38 is configured to send the ink from the negative-pressure tank 33 to the positive-pressure tank 31. The ink pump 38 is provided in the middle of the pump liquid sending path 37.

The pressure generator 22 is configured to generate a pressure for circulating the ink in the positive-pressure tank 31 and the negative-pressure tank 33 of the ink circulator 21. Specifically, the pressure generator 22 applies a positive pressure to the positive-pressure tank 31 and a negative pressure to the negative-pressure tank 33 by sucking the air from the negative-pressure tank 33 through the negative-pressure air path 24 and sending the air to the positive-pressure tank 31 through the positive-pressure air path 23. The pressure generator 22 is common to the ink circulators 21A to 21D.

The positive-pressure air path 23 connects the pressure generator 22 and an air layer on the liquid level of the ink in the positive-pressure tank 31. The positive-pressure air path 23 is provided in one-to-one correspondence with each of the ink circulators 21A to 21D.

The negative-pressure air path 24 connects the pressure generator 22 and an air layer on the liquid level of the ink in the negative-pressure tank 33. The negative-pressure air path 24 is provided in one-to-one correspondence with each of the ink circulators 21A to 21D.

The ink suppliers 5A to 5D are configured to supply the inks to the negative-pressure tanks 33 of the ink circulators 21A to 21D, respectively. The ink supplier 5 is configured to supply the ink to the negative-pressure tank 33 by using a hydraulic head pressure between an ink cartridge 41, which will be described later, and the negative-pressure tank 33. In the inkjet printer 1, the ink supplier 5 common to the ink towers 4A to 4C is provided for each ink color.

That is, the ink supplier 5A supplies the ink to the ink circulators 21A of the ink towers 4A to 4C. The ink supplier 5B supplies the ink to the ink circulators 21B of the ink towers 4A to 4C. The ink supplier 5C supplies the ink to the ink circulators 21C of the ink towers 4A to 4C. The ink supplier 5D supplies the ink to the ink circulators 21D of the ink towers 4A to 4C.

The ink supplier 5 includes the ink cartridge (a liquid container) 41, an ink supply path 42, and ink supply valves (supply valves) 43A to 43C.

The ink cartridge 41 stores the ink used for printing by the inkjet head 11. The ink cartridge 41 is arranged at a position higher than the negative-pressure tank 33 of the ink tower 4C. The ink inside the ink cartridge 41 is supplied to the negative-pressure tank 33 of the ink circulator 21 through the ink supply path 42.

The ink supply path 42 connects the ink cartridge 41 and three negative-pressure tanks 33 to which the ink in that ink cartridge 41 is to be supplied. Through the ink supply path 42, the ink flows from the ink cartridge 41 toward the negative-pressure tanks 33. The ink supply path 42 includes a main path 46 and branch paths 47A to 47C.

The main path 46 is a path through which the ink flows from the ink cartridge 41 to the branch paths 47A to 47C. The upstream end of the main path 46 is connected to the ink cartridge 41, and the downstream end of the main path 46 is connected to the upstream end of the branch path 47B and the upstream end of the branch path 47C.

The branch paths 47A to 47C are paths which branch from the main path 46 and connected to the negative-pressure tanks 33 of the ink towers 4A to 4C, respectively. The upstream end of the branch path 47A is connected to the middle of the main path 46, and the downstream end of the branch path 47A is connected to the negative-pressure tank 33 of the ink tower 4A. The upstream end of the branch path 47B is connected to the downstream end of the main path 46, and the downstream end of the branch path 47B is connected to the negative-pressure tank 33 of the ink tower 4B. The upstream end of the branch path 47C is connected to the downstream end of the main path 46, and the downstream end of the branch path 47C is connected to the negative-pressure tank 33 of the ink tower 4C.

Here, the three negative-pressure tanks 33 to which the branch paths 47A to 47C are connected, respectively are arranged at height positions different from one another and lower than the ink cartridge 41, in accordance with the height positions of the ink towers 4A to 4C in which the negative-pressure tanks 33 are provided, respectively. Among the three negative-pressure tanks 33 to which the branch paths 47A to 47C are connected, respectively, the negative-pressure tank 33 to which the branch path 47A is connected is arranged at the lowest position, and the negative-pressure tank 33 to which the branch path 47C is connected is arranged at the highest position.

The ink supply valves 43A to 43C are arranged in the branch paths 47A to 47C, respectively, and are configured to open and close the flow passages of the inks in the branch paths 47A to 47C. When the ink is supplied to the negative-pressure tank 33, the ink supply valve 43 is opened.

The controller 6 is configured to control the operation of each unit of the inkjet printer 1. The controller 6 includes a CPU, a RAM, a ROM, a hard disk, and the like.

The controller 6 performs printing by causing the inkjet heads 11 of the head units 3A and 3B to eject the inks while circulating the inks in the ink circulators 21A to 21D of the ink towers 4A to 4C. During the printing operation, the controller 6 controls the ink supply valves 43A to 43C of the ink suppliers 5A to 5D to supply the inks from the ink cartridges 41 to the respective negative-pressure tanks 33. In this ink supply operation during the printing operation, the controller 6 controls, for each ink supplier 5, the ink supply valves 43A to 43C in such a manner as to temporally separately perform the supply of the ink to the three negative-pressure tanks 33 which are the supply destinations of the ink in that ink supplier 5. That is, the controller 6 performs, for each ink supplier 5, the process of controlling the ink supply valve 43 corresponding to each of the three negative-pressure tanks 33 to supply the ink to the negative-pressure tank 33, at different timings for the respective negative-pressure tanks 33. At the time of initial ink filling as well, the controller 6 similarly controls, for each ink supplier 5, the ink supply valves 43A to 43C in such a manner as to temporally separately perform the supply of the ink to the three negative-pressure tanks 33.

Next, the operation of the inkjet printer 1 will be described.

Upon input of a print job, the controller 6 starts ink circulation in the ink circulators 21A to 21D of the ink towers 4A to 4C. Specifically, the controller 6 causes the pressure generators 22 of the ink towers 4A to 4C to generate set pressures for ink circulation in the positive-pressure tanks 31 and the negative-pressure tanks 33. This starts the ink circulation in the ink circulators 21A to 21D to cause the inks to flow from the positive-pressure tanks 31 to the negative-pressure tanks 33 through the inkjet heads 11.

Once the ink circulation is started, the controller 6 starts the execution of the print job. Specifically, the controller 6 performs such control that the inks are ejected from the respective inkjet heads 11 of the head units 3A and 3B to print an image on the print medium 7 while the print medium 7 is being conveyed by the conveyor 2.

During the execution of the print job, the inks are supplied from the positive-pressure tanks 31 to the inkjet heads 11, and the inks which have not been consumed in the inkjet heads 11 are recovered to the negative-pressure tanks 33. When the positive-pressure tank liquid level sensor 32 is off and the negative-pressure tank liquid level sensor 34 turns on, the controller 6 drives the ink pump 38. This sends the ink from the negative-pressure tank 33 to the positive-pressure tank 31. When the positive-pressure tank liquid level sensor 32 turns on, the controller 6 stops the ink pump 38. In this way, printing is performed while the inks are being circulated.

In addition, during this printing operation, the controller 6 performs an ink supply operation using the ink suppliers 5A to 5D. In this ink supply operation, the controller 6 controls, for each ink supplier 5, the ink supply valves 43A to 43C in such a manner as to temporally separately perform the supply of the ink to the three negative-pressure tanks 33 which are the supply destinations of the ink in that ink supplier 5. The detail of this ink supply operation will be described later.

When the printing based on the print job ends, the controller 6 controls the pressure generators 22 to end the ink circulation in the ink circulators 21A to 21D.

Next, the above-mentioned ink supply operation will be described.

Figure 6:
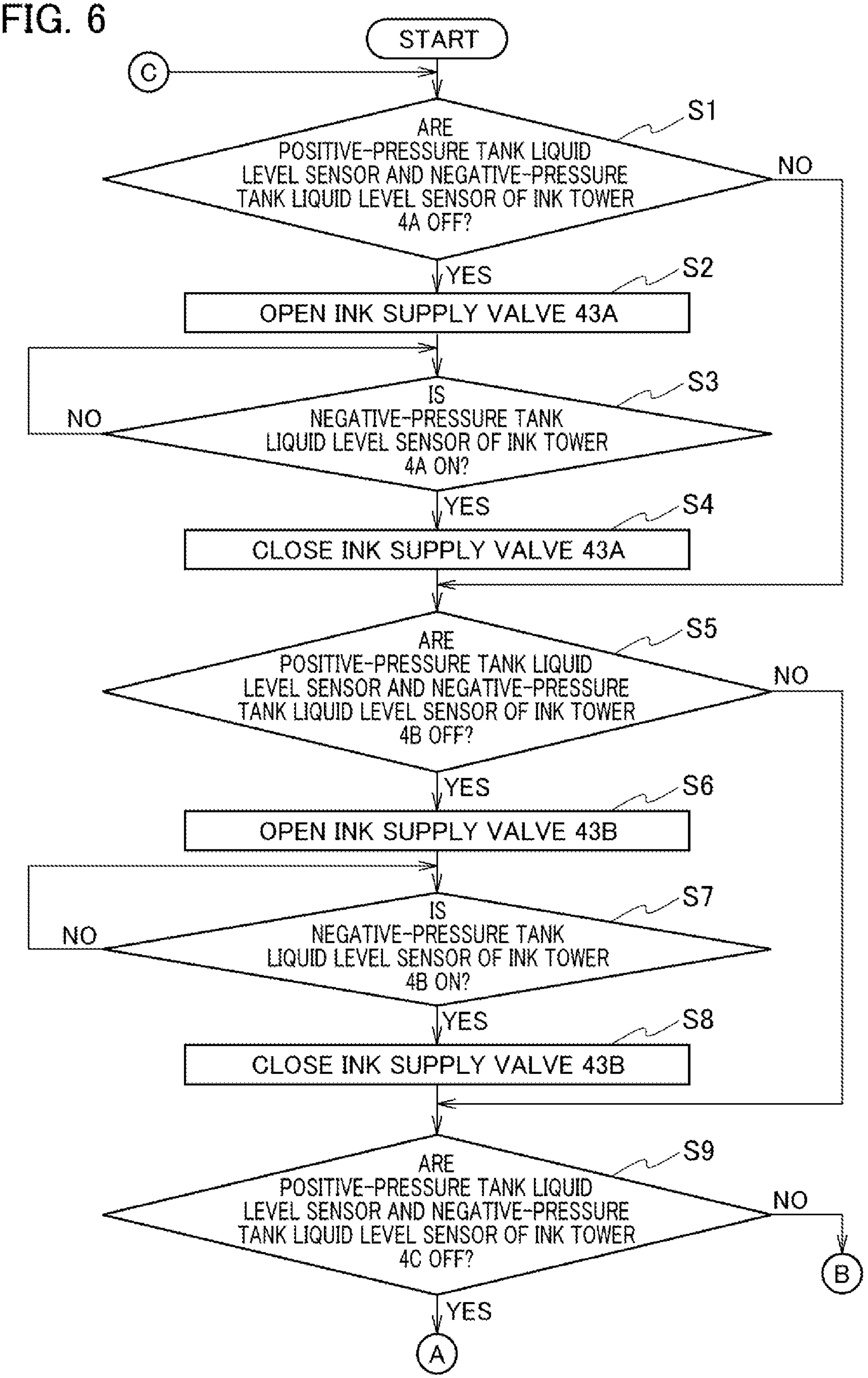
FIG. 6 is a flowchart for explaining an ink supply operation during a printing operation.
Figure 7:
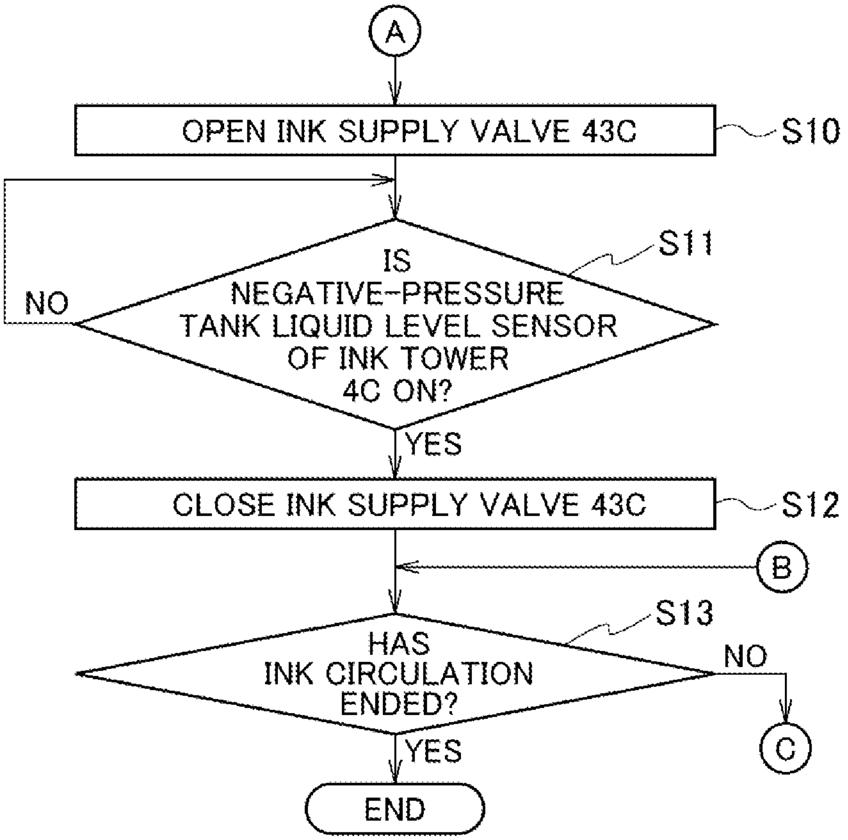
FIG. 7 is a flowchart for explaining the ink supply operation during the printing operation.

FIG. 6 and FIG. 7 are flowcharts for explaining the ink supply operation. The flowcharts of FIG. 6 and FIG. 7 illustrate the operation performed by each of the ink suppliers 5A to 5D. Hence, the operation of one ink supplier 5 will be described here, and the negative-pressure tank 33, the negative-pressure tank liquid level sensor 34, and the like in this description are those in the ink circulator 21 to which the ink is to be supplied from that ink supplier 5. The processing of the flowcharts of FIG. 6 and FIG. 7 starts when the ink circulation is started.

In step S1 of FIG. 6, the controller 6 determines whether or not both the positive-pressure tank liquid level sensor 32 and the negative-pressure tank liquid level sensor 34 of the ink tower 4A are off.

If the controller 6 determines that both the positive-pressure tank liquid level sensor 32 and the negative-pressure tank liquid level sensor 34 of the ink tower 4A are off (step S1: YES), in step S2, the controller 6 opens the ink supply valve 43A. This allows the ink to be supplied to the negative-pressure tank 33 of the ink tower 4A through the branch path 47A by the hydraulic head pressure between the ink cartridge 41 and the negative-pressure tank 33 of the ink tower 4A and the negative pressure of the negative-pressure tank 33.

Subsequently, in step S3, the controller 6 determines whether or not the negative-pressure tank liquid level sensor 34 of the ink tower 4A has turned on. If the controller 6 determines that the negative-pressure tank liquid level sensor 34 has not turned on (step S3: NO), the controller 6 repeats step S3.

If the controller 6 determines that the negative-pressure tank liquid level sensor 34 has turned on (step S3: YES), in step S4, the controller 6 closes the ink supply valve 43A. This stops the supply of the ink to the negative-pressure tank 33 of the ink tower 4A. Thereafter, the controller 6 proceeds to step S5.

In step S1, if the controller 6 determines that at least one of the positive-pressure tank liquid level sensor 32 and the negative-pressure tank liquid level sensor 34 of the ink tower 4A is on (step S1: NO), the controller 6 proceeds to step S5.

In step S5, the controller 6 determines whether or not both the positive-pressure tank liquid level sensor 32 and the negative-pressure tank liquid level sensor 34 of the ink tower 4B are off.

If the controller 6 determines that both the positive-pressure tank liquid level sensor 32 and the negative-pressure tank liquid level sensor 34 of the ink tower 4B are off (step S5: YES), in step S6, the controller 6 opens the ink supply valve 43B. This allows the ink to be supplied to the negative-pressure tank 33 of the ink tower 4B through the branch path 47B by the hydraulic head pressure between the ink cartridge 41 and the negative-pressure tank 33 of the ink tower 4B and the negative pressure of the negative-pressure tank 33.

Subsequently, in step S7, the controller 6 determines whether or not the negative-pressure tank liquid level sensor 34 of the ink tower 4B has turned on. If the controller 6 determines that the negative-pressure tank liquid level sensor 34 has not turned on (step S7: NO), the controller 6 repeats step S7.

If the controller 6 determines that the negative-pressure tank liquid level sensor 34 has turned on (step S7: YES), in step S8, the controller 6 closes the ink supply valve 43B. This stops the supply of the ink to the negative-pressure tank 33 of the ink tower 4B. Thereafter, the controller 6 proceeds to step S9.

In step S5, if the controller 6 determines that at least one of the positive-pressure tank liquid level sensor 32 and the negative-pressure tank liquid level sensor 34 of the ink tower 4B is on (step S5: NO), the controller 6 proceeds to step S9.

In step S9, the controller 6 determines whether or not both the positive-pressure tank liquid level sensor 32 and the negative-pressure tank liquid level sensor 34 of the ink tower 4C are off.

If the controller 6 determines that both the positive-pressure tank liquid level sensor 32 and the negative-pressure tank liquid level sensor 34 of the ink tower 4C are off (step S9: YES), in step S10 of FIG. 7, the controller 6 opens the ink supply valve 43C. This allows the ink to be supplied to the negative-pressure tank 33 of the ink tower 4C through the branch path 47C by the hydraulic head pressure between the ink cartridge 41 and the negative-pressure tank 33 of the ink tower 4C and the negative pressure of the negative-pressure tank 33.

Subsequently, in step S11, the controller 6 determines whether or not the negative-pressure tank liquid level sensor 34 of the ink tower 4C has turned on. If the controller 6 determines that the negative-pressure tank liquid level sensor 34 has not turned on (step S11: NO), the controller 6 repeats step S11.

If the controller 6 determines that the negative-pressure tank liquid level sensor 34 has turned on (step S11: YES), in step S12, the controller 6 closes the ink supply valve 43C. This stops the supply of the ink to the negative-pressure tank 33 of the ink tower 4C. Thereafter, the controller 6 proceeds to step S13.

In step S9 of FIG. 6, if the controller 6 determines that at least one of the positive-pressure tank liquid level sensor 32 and the negative-pressure tank liquid level sensor 34 of the ink tower 4C is on (step S9: NO), the controller 6 proceeds to step S13 of FIG. 7.

In step S13, the controller 6 determines whether or not the ink circulation has ended. If the controller 6 determines that the ink circulation has not ended (step S13: NO), the controller 6 returns to step S1.

If the controller 6 determines that the ink circulation has ended (step S13: YES), the series of operations ends.

Next, the operation of the ink supplier 5 at the time of ink initial filling in the inkjet printer 1 will be described.

The ink initial filling is performed for filling each ink circulator 21 and each inkjet head 11 with the ink from the state where there is no ink in each ink circulator 21 and each inkjet head 11. The ink initial filling is performed, for example, to bring the inkjet printer 1 into the state of being capable of the printing operation when a maintenance work which is performed by draining the inks from the ink circulators 21 and the inkjet heads 11 is ended or when the inkjet printer 1 is completed.

FIG. 8 to FIG. 12 are flowcharts for explaining the operation of the ink supplier 5 at the time of the ink initial filling. The flowcharts of FIG. 8 to FIG. 12 illustrate the operation performed by each of the ink suppliers 5A to 5D as in the case of the above-mentioned flowcharts of FIG. 6 and FIG. 7. Hence, the operation of one ink supplier 5 will be described as in the case of the description of the above-mentioned flowcharts of FIG. 6.

Figure 8:
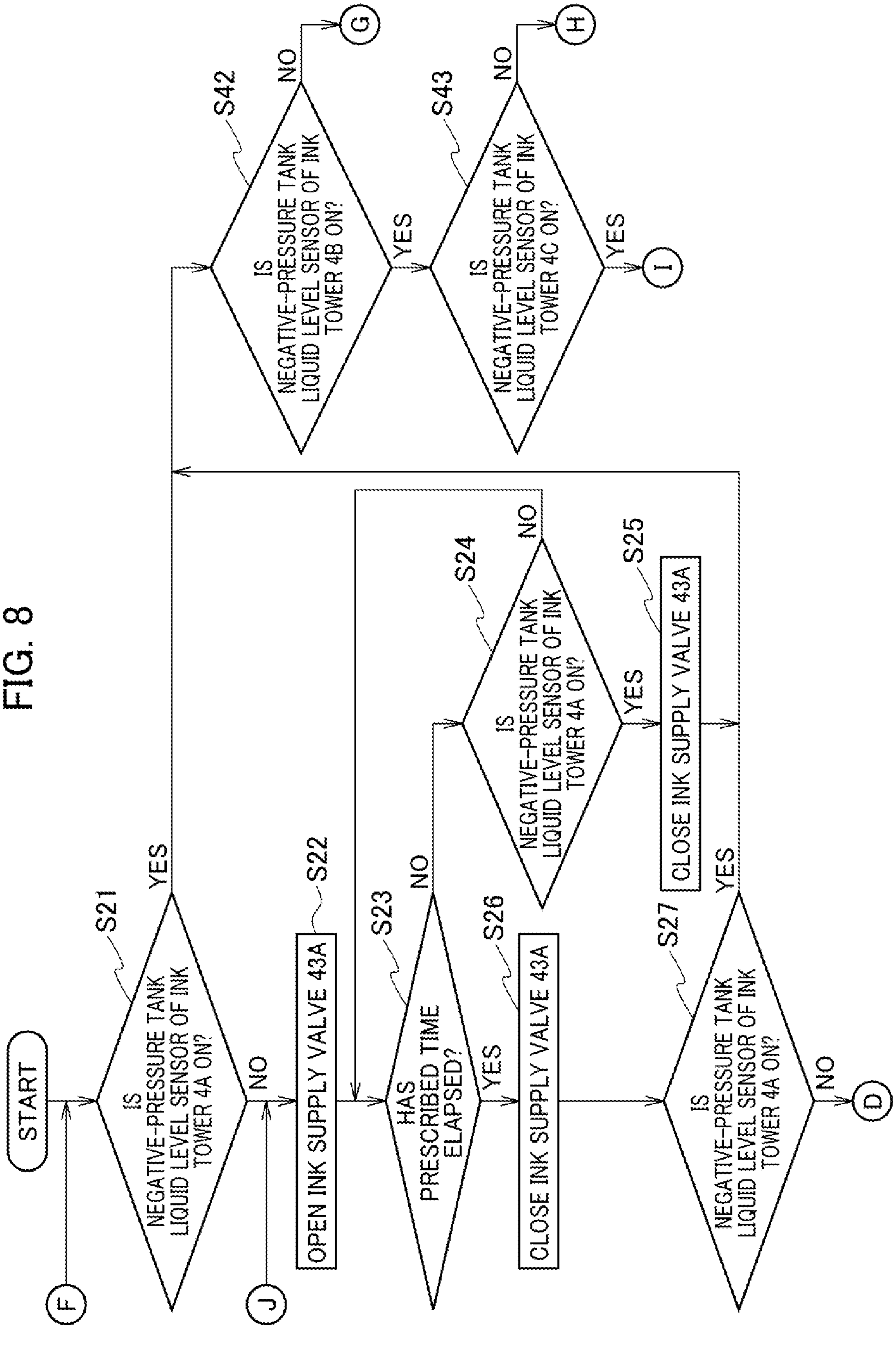
FIG. 8 is a flowchart for explaining an operation of the ink supplier at the time of ink initial filling.

Once the ink initial filling is started, in step S21 of FIG. 8, the controller 6 determines whether or not the negative-pressure tank liquid level sensor 34 of the ink tower 4A is on. If the controller 6 determines that the negative-pressure tank liquid level sensor 34 of the ink tower 4A is on (step S21: YES), the controller 6 proceeds to step S42, which will be described later.

Here, at the time of starting the initial filling, since the negative-pressure tanks 33 of the ink towers 4A to 4C are empty, the negative-pressure tank liquid level sensors 34 of the ink towers 4A to 4C are off.

If the controller 6 determines that the negative-pressure tank liquid level sensor 34 of the ink tower 4A is off (step S21: NO), in step S22, the controller 6 opens the ink supply valve 43A.

Here, at the time of starting the initial filling, a positive pressure is applied to the positive-pressure tank 31 by the pressure generator 22, and the negative-pressure tank 33 is open to the atmosphere. Hence, when the ink supply valve 43A is opened, the ink is supplied to the negative-pressure tank 33 of the ink tower 4A through the branch path 47A by only the hydraulic head pressure between the ink cartridge 41 and the negative-pressure tank 33 of the ink tower 4A.

Subsequently, in step S23, the controller 6 determines whether or not a prescribed time has elapsed after the ink supply valve 43A was opened. Here, the prescribed time is set in advance as a time for opening the ink supply valve 43 once until the negative-pressure tank liquid level sensors 34 initially turn on in the ink towers 4A to 4C. The prescribed time is set for each ink tower 4 in accordance with the hydraulic head pressure between the ink cartridge 41 and the negative-pressure tank 33 of the ink tower 4 such that the amount of the ink supplied when the ink supply valve 43 is opened for the prescribed time becomes a prescribed amount.

If the controller 6 determines that the prescribed time has not elapsed (step S23: NO), in step S24, the controller 6 determines whether or not the negative-pressure tank liquid level sensor 34 of the ink tower 4A has turned on. If the controller 6 determines that the negative-pressure tank liquid level sensor 34 of the ink tower 4A is off (step S24: NO), the controller 6 returns to step S23.

If the controller 6 determines that the negative-pressure tank liquid level sensor 34 of the ink tower 4A has turned on (step S24: YES), in step S25, the controller 6 closes the ink supply valve 43A. This stops the supply of the ink to the negative-pressure tank 33 of the ink tower 4A. Thereafter, the controller 6 proceeds to step S42, which will be described later.

In step S23, if the controller 6 determines that the prescribed time has elapsed (step S23: YES), in step S26, the controller 6 closes the ink supply valve 43A. This stops the supply of the ink to the negative-pressure tank 33 of the ink tower 4A.

Subsequently, in step S27, the controller 6 determines whether or not the negative-pressure tank liquid level sensor

34 of the ink tower 4A has turned on. If the controller 6 determines that the negative-pressure tank liquid level sensor 34 of the ink tower 4A has turned on (step S27: YES), the controller 6 proceeds to step S42, which will be described later.

If the controller 6 determines that the negative-pressure tank liquid level sensor 34 of the ink tower 4A is off (step S27: NO), in step S28 of FIG. 9, the controller 6 determines whether or not the negative-pressure tank liquid level sensor 34 of the ink tower 4B is on. If the controller 6 determines that the negative-pressure tank liquid level sensor 34 of the ink tower 4B is on (step S28: YES), the controller 6 proceeds to step S44, which will be described later.

If the controller 6 determines that the negative-pressure tank liquid level sensor 34 of the ink tower 4B is off (step S28: NO), in step S29, the controller 6 opens the ink supply valve 43B. This allows the ink to be supplied to the negative-pressure tank 33 of the ink tower 4B through the branch path 47B by only the hydraulic head pressure between the ink cartridge 41 and the negative-pressure tank 33 of the ink tower 4B.

Subsequently, in step S30, the controller 6 determines whether or not the prescribed time has elapsed after the ink supply valve 43B was opened.

If the controller 6 determines that the prescribed time has not elapsed (step S30: NO), in step S31, the controller 6 determines whether or not the negative-pressure tank liquid level sensor 34 of the ink tower 4B has turned on. If the controller 6 determines that the negative-pressure tank liquid level sensor 34 of the ink tower 4B is off (step S31: NO), the controller 6 returns to step S30.

If the controller 6 determines that the negative-pressure tank liquid level sensor 34 of the ink tower 4B has turned on (step S31: YES), in step S32, the controller 6 closes the ink supply valve 43B. This stops the supply of the ink to the negative-pressure tank 33 of the ink tower 4B. Thereafter, the controller 6 proceeds to step S44, which will be described later.

In step S30, if the controller 6 determines that the prescribed time has elapsed (step S30: YES), in step S33, the controller 6 closes the ink supply valve 43B. This stops the supply of the ink to the negative-pressure tank 33 of the ink tower 4B.

Subsequently, in step S34, the controller 6 determines whether or not the negative-pressure tank liquid level sensor 34 of the ink tower 4B has turned on. If the controller 6 determines that the negative-pressure tank liquid level sensor 34 of the ink tower 4B has turned on (step S34: YES), the controller 6 proceeds to step S44, which will be described later.

If the controller 6 determines that the negative-pressure tank liquid level sensor 34 of the ink tower 4B is off (step S34: NO), in step S35 of FIG. 10, the controller 6 determines whether or not the negative-pressure tank liquid level sensor 34 of the ink tower 4C is on. If the controller 6 determines that the negative-pressure tank liquid level sensor 34 of the ink tower 4C is on (step S35: YES), the controller 6 proceeds to step S46, which will be described later.

If the controller 6 determines that the negative-pressure tank liquid level sensor 34 of the ink tower 4C is off (step S35: NO), in step S36, the controller 6 opens the ink supply valve 43C. This allows the ink to be supplied to the negative-pressure tank 33 of the ink tower 4C through the branch path 47C by only the hydraulic head pressure between the ink cartridge 41 and the negative-pressure tank 33 of the ink tower 4C.

Subsequently, in step S37, the controller 6 determines whether or not the prescribed time has elapsed after the ink supply valve 43C was opened.

If the controller 6 determines that the prescribed time has not elapsed (step S37: NO), in step S38, the controller 6 determines whether or not the negative-pressure tank liquid level sensor 34 of the ink tower 4C has turned on. If the controller 6 determines that the negative-pressure tank liquid level sensor 34 of the ink tower 4C is off (step S38: NO), the controller 6 returns to step S37.

If the controller 6 determines that the negative-pressure tank liquid level sensor 34 of the ink tower 4C has turned on (step S38: YES), in step S39, the controller 6 closes the ink supply valve 43C. This stops the supply of the ink to the negative-pressure tank 33 of the ink tower 4C. Thereafter, the controller 6 proceeds to step S46, which will be described later.

In step S37, if the controller 6 determines that the prescribed time has elapsed (step S37: YES), in step S40, the controller 6 closes the ink supply valve 43C. This stops the supply of the ink to the negative-pressure tank 33 of the ink tower 4C.

Subsequently, in step S41, the controller 6 determines whether or not the negative-pressure tank liquid level sensor 34 of the ink tower 4C has turned on.

If the controller 6 determines that the negative-pressure tank liquid level sensor 34 of the ink tower 4C is off (step S41: NO), the controller 6 returns to step S21 of FIG. 8.

In step S42 of FIG. 8, the controller 6 determines whether or not the negative-pressure tank liquid level sensor 34 of the ink tower 4B is on. If the controller 6 determines that the negative-pressure tank liquid level sensor 34 of the ink tower 4B is off (step S42: NO), the controller 6 proceeds to step S29 of FIG. 9.

If the controller 6 determines that the negative-pressure tank liquid level sensor 34 of the ink tower 4B is on (step S42: YES), in step S43, the controller 6 determines whether or not the negative-pressure tank liquid level sensor 34 of the ink tower 4C is on. If the controller 6 determines that the negative-pressure tank liquid level sensor 34 of the ink tower 4C is off (step S43: NO), the controller 6 proceeds to step S36 of FIG. 10.

If the controller 6 determines that the negative-pressure tank liquid level sensor 34 of the ink tower 4C is on (step S43: YES), the controller 6 proceeds to step S48 of FIG. 11, which will be described later.

Figure 9:
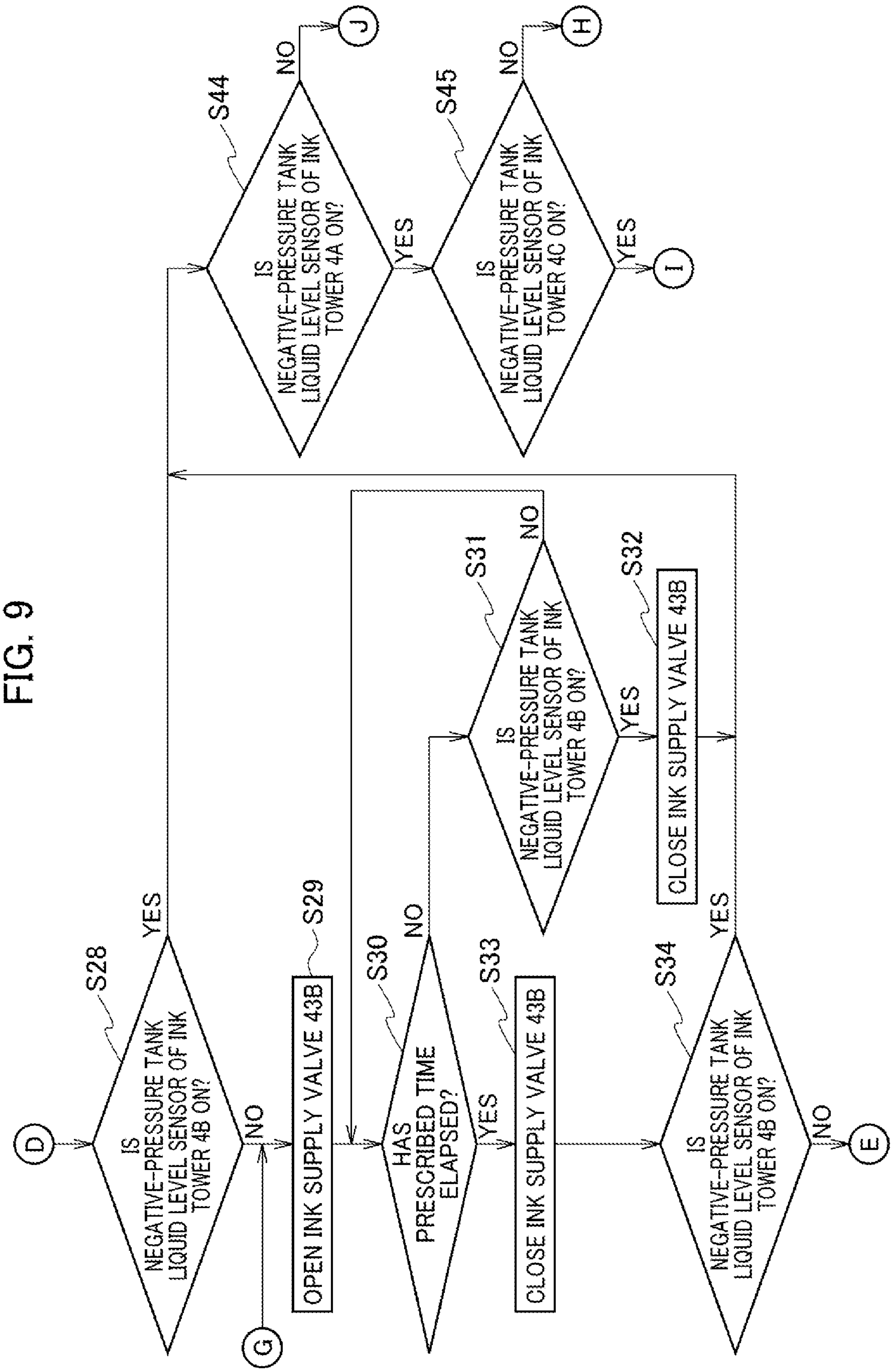
FIG. 9 is a flowchart for explaining the operation of the ink supplier at the time of the ink initial filling.

In step S44 of FIG. 9, the controller 6 determines whether or not the negative-pressure tank liquid level sensor 34 of the ink tower 4A is on. If the controller 6 determines that the negative-pressure tank liquid level sensor 34 of the ink tower 4A is off (step S44: NO), the controller 6 proceeds to step S22 of FIG. 8.

If the controller 6 determines that the negative-pressure tank liquid level sensor 34 of the ink tower 4A is on (step S44: YES), in step S45, the controller 6 determines whether or not the negative-pressure tank liquid level sensor 34 of the ink tower 4C is on. If the controller 6 determines that the negative-pressure tank liquid level sensor 34 of the ink tower 4C is off (step S45: NO), the controller 6 proceeds to step S36 of FIG. 10.

If the controller 6 determines that the negative-pressure tank liquid level sensor 34 of the ink tower 4C is on (step S45: YES), the controller 6 proceeds to step S48 of FIG. 11, which will be described later.

Figure 10:
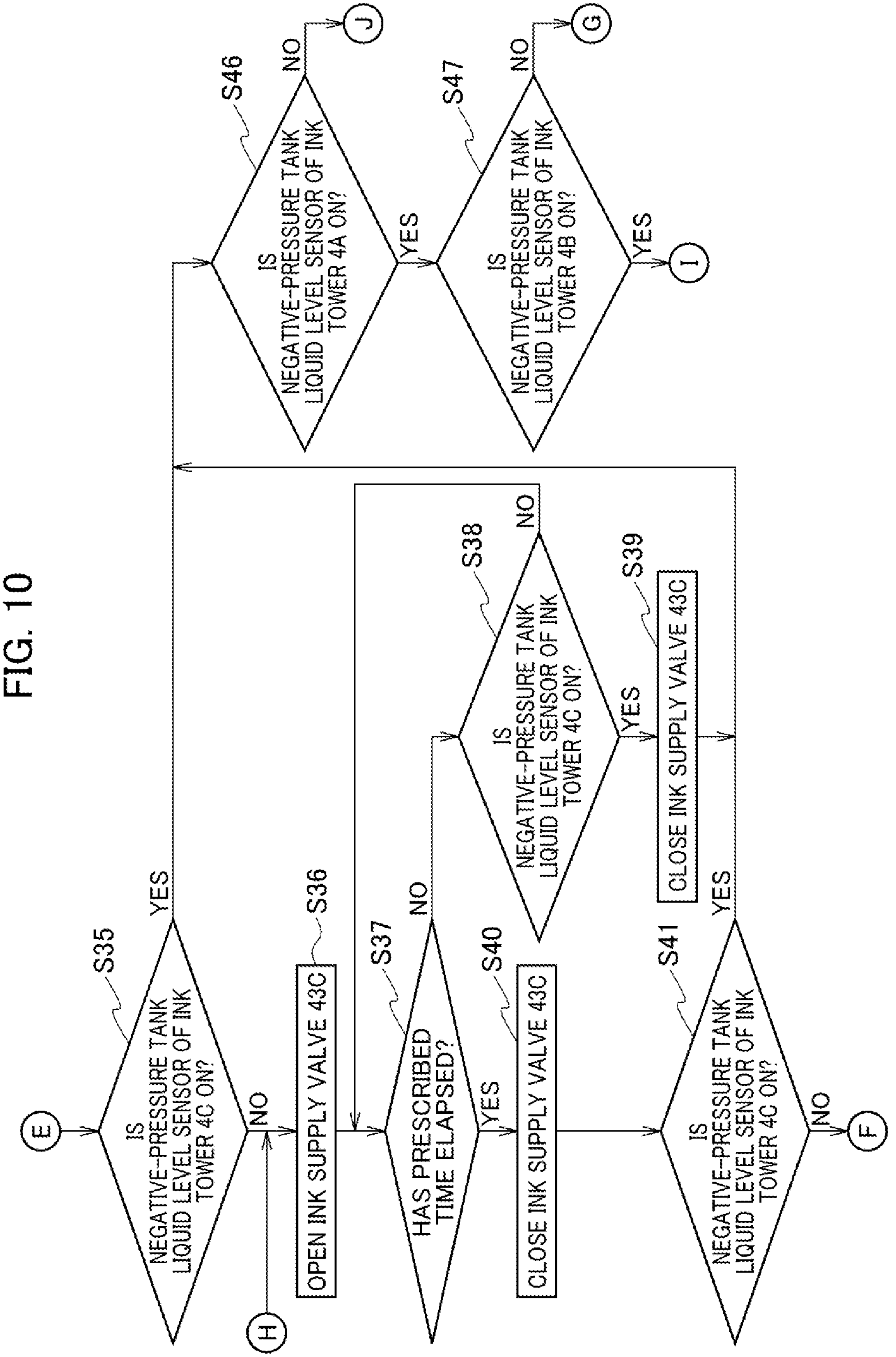
FIG. 10 is a flowchart for explaining the operation of the ink supplier at the time of the ink initial filling.

In step S46 of FIG. 10, the controller 6 determines whether or not the negative-pressure tank liquid level sensor 34 of the ink tower 4A is on. If the controller 6 determines that the negative-pressure tank liquid level sensor 34 of the ink tower 4A is off (step S46: NO), the controller 6 proceeds to step S22 of FIG. 8.

If the controller 6 determines that the negative-pressure tank liquid level sensor 34 of the ink tower 4A is on (step S46: YES), in step S47, the controller 6 determines whether or not the negative-pressure tank liquid level sensor 34 of the ink tower 4B is on. If the controller 6 determines that the negative-pressure tank liquid level sensor 34 of the ink tower 4B is off (step S47: NO), the controller 6 proceeds to step S29 of FIG. 9.

If the controller 6 determines that the negative-pressure tank liquid level sensor 34 of the ink tower 4B is on (step S47: YES), the controller 6 proceeds to step S48 of FIG. 11, which will be described later.

By the processing of steps S21 to S47 of FIG. 8 to FIG. 10 as described above, the supply of the inks to the negative-pressure tanks 33 of the ink towers 4A to 4C is temporally separately performed, and the negative-pressure tank liquid level sensors 34 of the ink towers 4A to 4C first turn on. Thereafter, the processing proceeds to step S48 of FIG. 11.

Here, after the negative-pressure tank liquid level sensors 34 of the ink towers 4A to 4C first turn on, as in the case of the above-mentioned ink circulation during the printing operation, such control that when the positive-pressure tank liquid level sensor 32 is off and the negative-pressure tank liquid level sensor 34 turns on, the ink pump 38 is driven, and when the positive-pressure tank liquid level sensor 32 turns on, the ink pump 38 is stopped is performed. In addition, as described above, since a positive pressure is applied to the positive-pressure tank 31, the ink flows out from the positive-pressure tank 31 toward the inkjet head 11.

Figure 11:
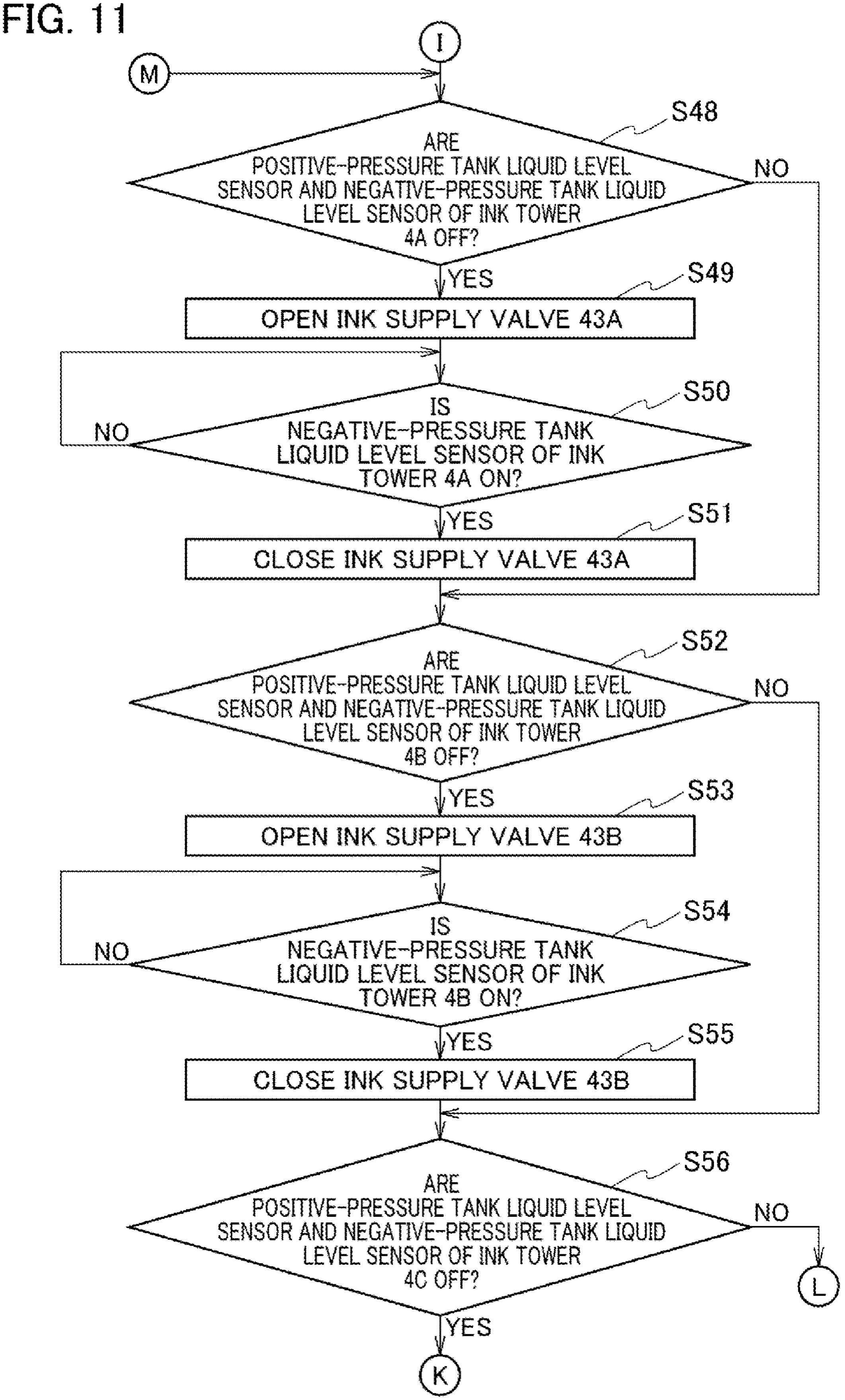
FIG. 11 is a flowchart for explaining the operation of the ink supplier at the time of the ink initial filling.
Figure 12:
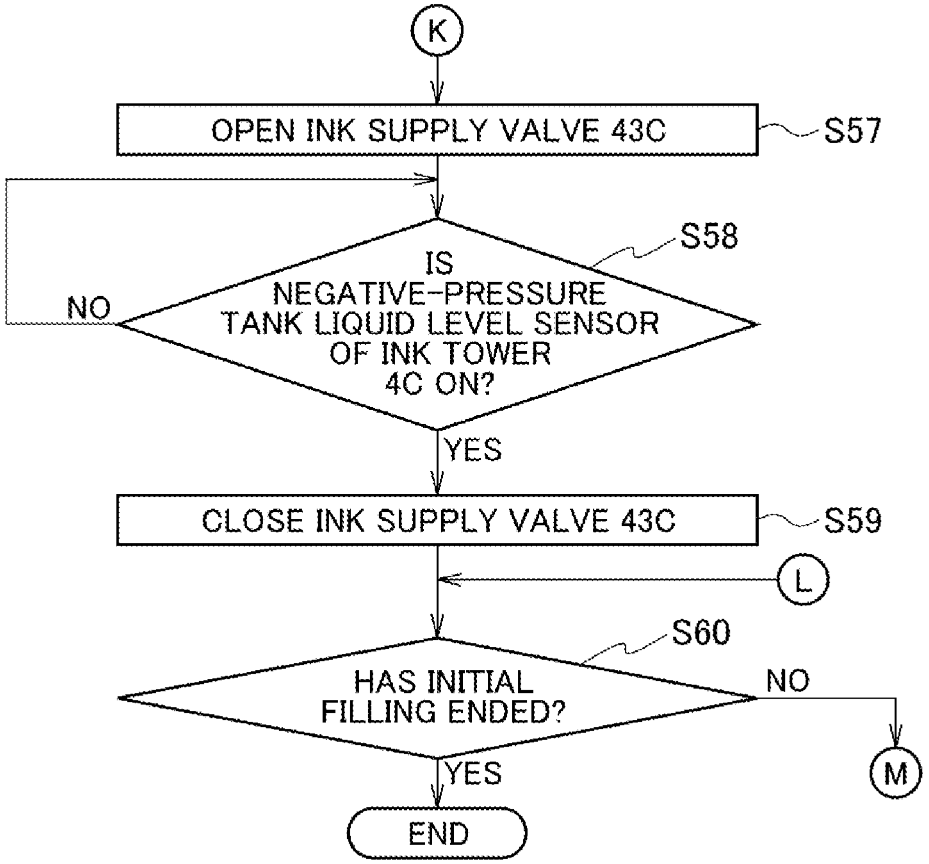
FIG. 12 is a flowchart for explaining the operation of the ink supplier at the time of the ink initial filling.

The processing of steps S48 to S59 of FIG. 11 to FIG. 12 is the same as the above-described processing of S1 to S12 of the flowcharts of FIG. 6 and FIG. 7.

In step S60 of FIG. 12, the controller 6 determines whether or not the ink initial filling has ended. Here, the controller 6 determines that the ink initial filling has ended if the number of times the positive-pressure tank liquid level sensor 32 has turned on reaches a prescribed number of times.

If the controller 6 determines that the ink initial filling has not ended (step S60: NO), the controller 6 returns to step S48 of FIG. 11.

If the controller 6 determines that the ink initial filling has ended (step S60: YES), the series of operations ends.

As described above, in the inkjet printer 1, the controller 6 controls, for each ink supplier 5, the ink supply valves 43A to 43C in such a manner as to temporally separately perform the supply of the ink to the negative-pressure tanks 33 which are the supply destinations of the ink in that ink supplier 5. That is, the controller 6 performs, for each ink supplier 5, the process of controlling the ink supply valve 43 corresponding to each of the three negative-pressure tanks 33 to supply the ink to the negative-pressure tank 33, at different timings for the respective negative-pressure tanks 33.

Here, in the case where the inks are to be simultaneously supplied to multiple negative-pressure tanks 33 unlike the present embodiment, since the hydraulic head pressure with the ink cartridge 41 is different from one negative-pressure tank 33 to another, there is a possibility that failures in supplying the ink to a negative-pressure tank 33 occur.

For example, there is a possibility that deviation occurs in the supply amounts of the ink of the respective negative-pressure tanks 33. This may generate a negative-pressure tank 33 which has difficulty in being supplied with the ink, which may cause trouble in the operation of the inkjet printer 1.

In addition, there is a possibility that the ink moves between negative-pressure tanks 33, that is, from a negative-pressure tank 33 which is located at a high position and has a relatively small hydraulic head pressure with the ink cartridge 41 to a negative-pressure tank 33 which is located at a low position and has a relatively large hydraulic head pressure with the ink cartridge 41. This may generate a negative-pressure tank 33 with the ink reduced, which may cause trouble in the operation of the inkjet printer 1.

In contrast, in the inkjet printer 1, it is possible to reduce failures in supplying the ink to a negative-pressure tank 33 as described above, by temporally separately performing the supply of the ink to the negative-pressure tanks 33 by the ink supplier 5.

Note that the ink supply valves 43A to 43C may be controlled such that the supply of the ink is temporally separately performed between negative-pressure tanks 33 the height difference between which is equal to or more than a prescribed value, and simultaneous supply of the ink is allowed between negative-pressure tanks 33 the height difference between which is less than the prescribed value. Here, the prescribed value for the height difference between negative-pressure tanks 33 is a value set based on experiments and the like as the lower limit value of height differences, which may cause failures in supplying the ink as described above.

For example, it is assumed that the height difference between the ink towers 4A and 4C is equal to or more than the prescribed value, and the height difference between the ink towers 4A and 4B as well as the height difference between the ink towers 4B and 4C are less than the prescribed value. The height differences of negative-pressure tanks 33 included in the ink towers 4 are equal to the height differences of the ink towers 4. In this case, the ink supply valves 43A to 43C may be controlled such that the supply of the inks is temporally separately performed between the negative-pressure tanks 33 of the ink towers 4A and 4C, and simultaneous supply of the inks is allowed for the negative-pressure tanks 33 of the ink towers 4A and 4B as well as between the negative-pressure tanks 33 of the ink towers 4B and 4C.

This also makes it possible to reduce failures in supplying the inks to the negative-pressure tanks 33 as described above.

In addition, although in the above-described embodiment, the configuration in which the supply destinations of the ink of one ink supplier 5 are three negative-pressure tanks 33, the number of negative-pressure tanks as supply destinations is not limited to this, and only has to be a plural number.

In addition, the present invention can be applied to a liquid supply apparatus configured to supply a liquid, not only an ink.

Embodiments of the disclosure have the following configurations, for example.

A liquid supply apparatus includes: a liquid container; branch paths branching from a path connected to the liquid container, the branch paths being connected to tanks arranged at height positions different from one another and lower than the liquid container; supply valves arranged in the branch paths respectively; and a controller configured to control the supply valves to supply a liquid from the liquid container to each of the tanks. The controller is configured to control the supply valves to temporally separately perform supply of the liquid to tanks of the tanks having a height difference equal to or more than a prescribed value therebetween.

The controller may be configured to control the supply valves to temporally separately perform the supply of the liquid to each of the tanks.

The controller may be configured to perform a process of controlling the supply valves corresponding to the respective tanks to supply the liquid to each of the tanks, at different timings for the respective tanks.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A liquid supply apparatus comprising:

a liquid container;

branch paths branching from a path connected to the liquid container, the branch paths being connected to tanks arranged at height positions different from one another and lower than the liquid container;

supply valves arranged in the branch paths respectively; and a controller configured to control the supply valves to supply a liquid from the liquid container to each of the tanks, wherein the controller is configured to control the supply valves to temporally separately perform supply of the liquid to tanks of the tanks having a height difference equal to or more than a prescribed value therebetween.

2. The liquid supply apparatus according to claim 1, wherein the controller is configured to control the supply valves to temporally separately perform the supply of the liquid to each of the tanks.

3. The liquid supply apparatus according to claim 1, wherein the controller is configured to perform a process of controlling the supply valves corresponding to the respective tanks to supply the liquid to each of the tanks, at different timings for the respective tanks.

* * * * *